Oct. 31, 1967   J. A. JOHNS ET AL   3,349,658
WORKPIECE POSITIONING SYSTEM
Filed Oct. 22, 1965   4 Sheets-Sheet 3
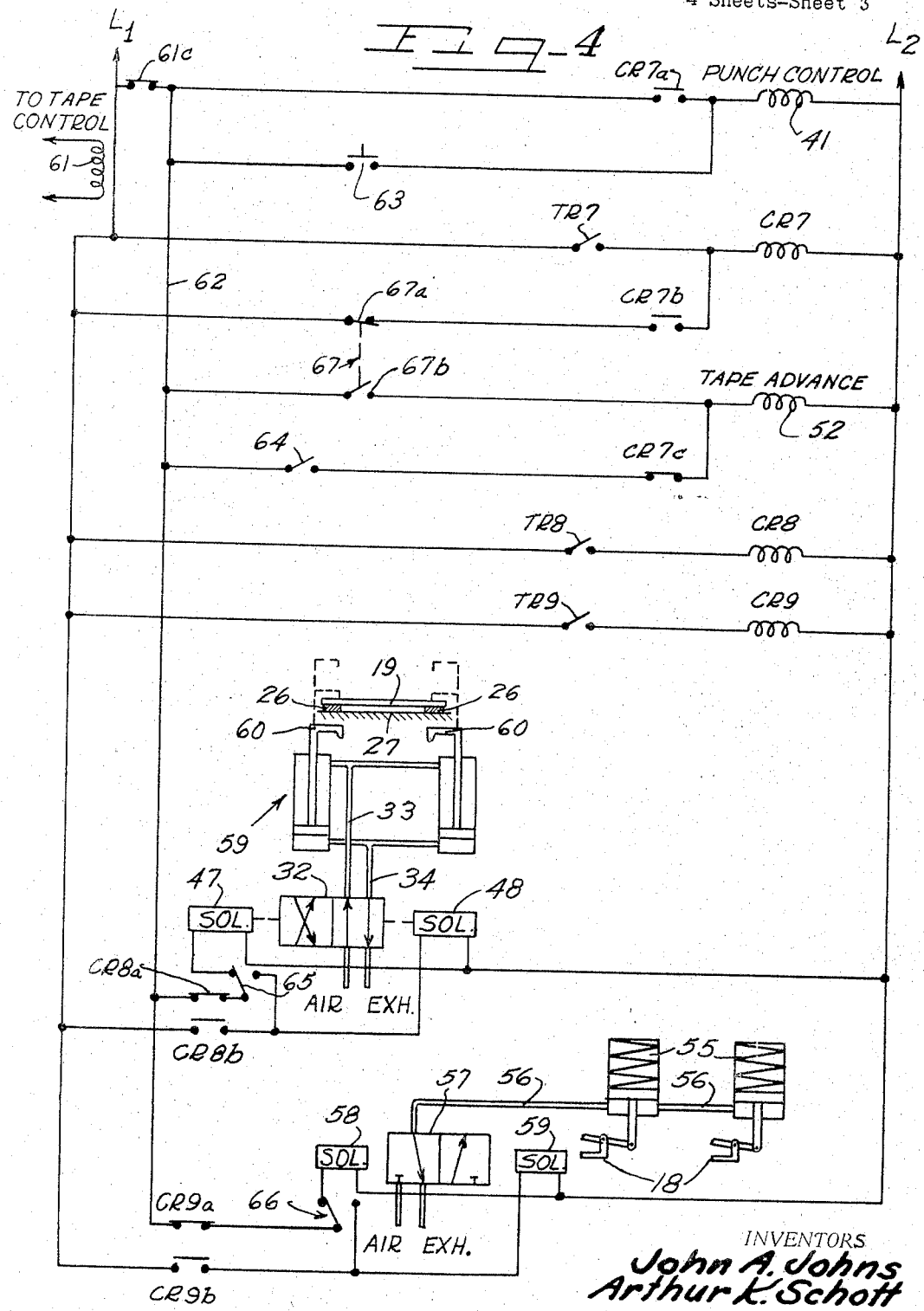
INVENTORS
John A. Johns
Arthur K. Schott
BY Hill, Sherman, Meroni, Gross & Simpson  ATTORNEYS

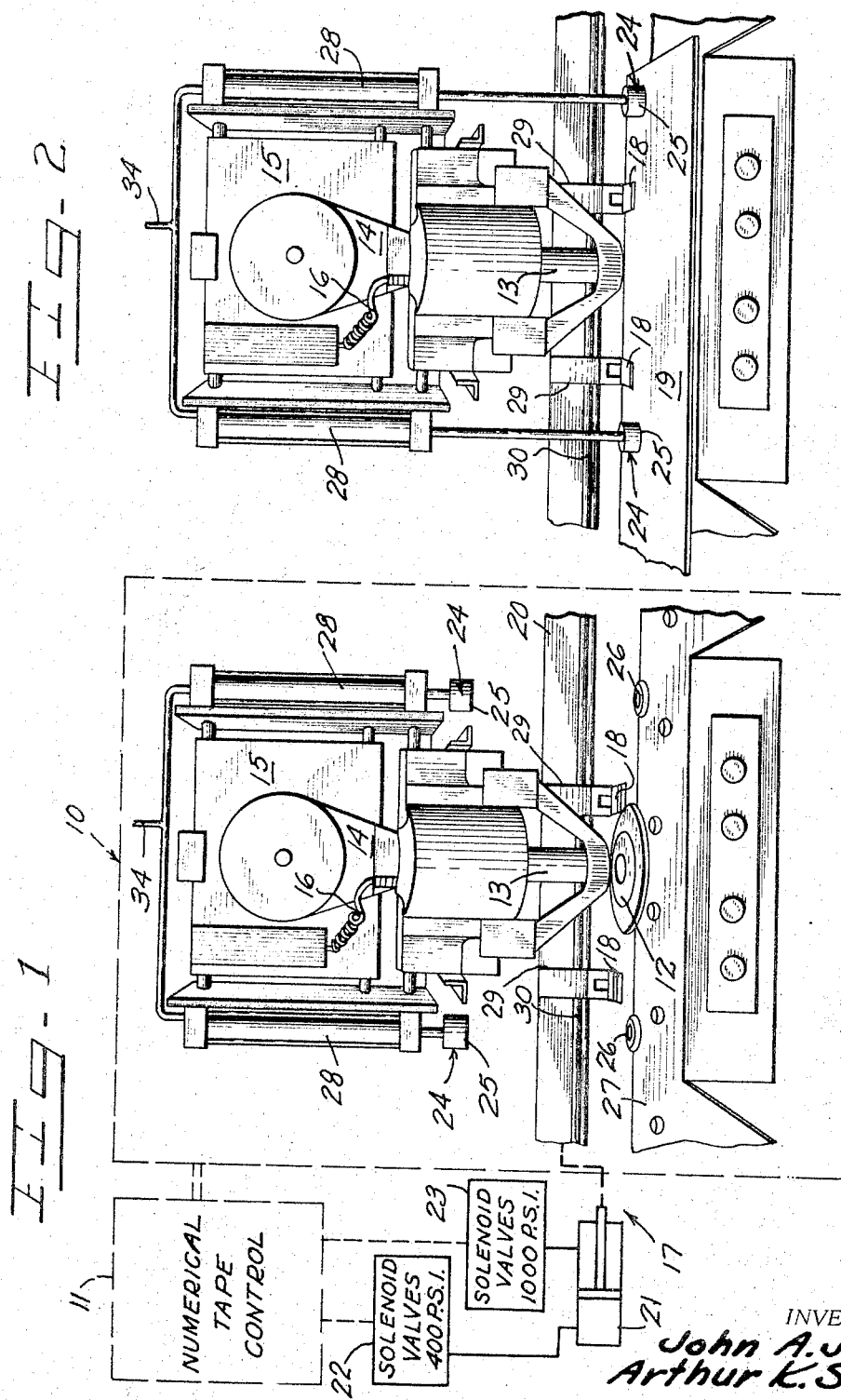

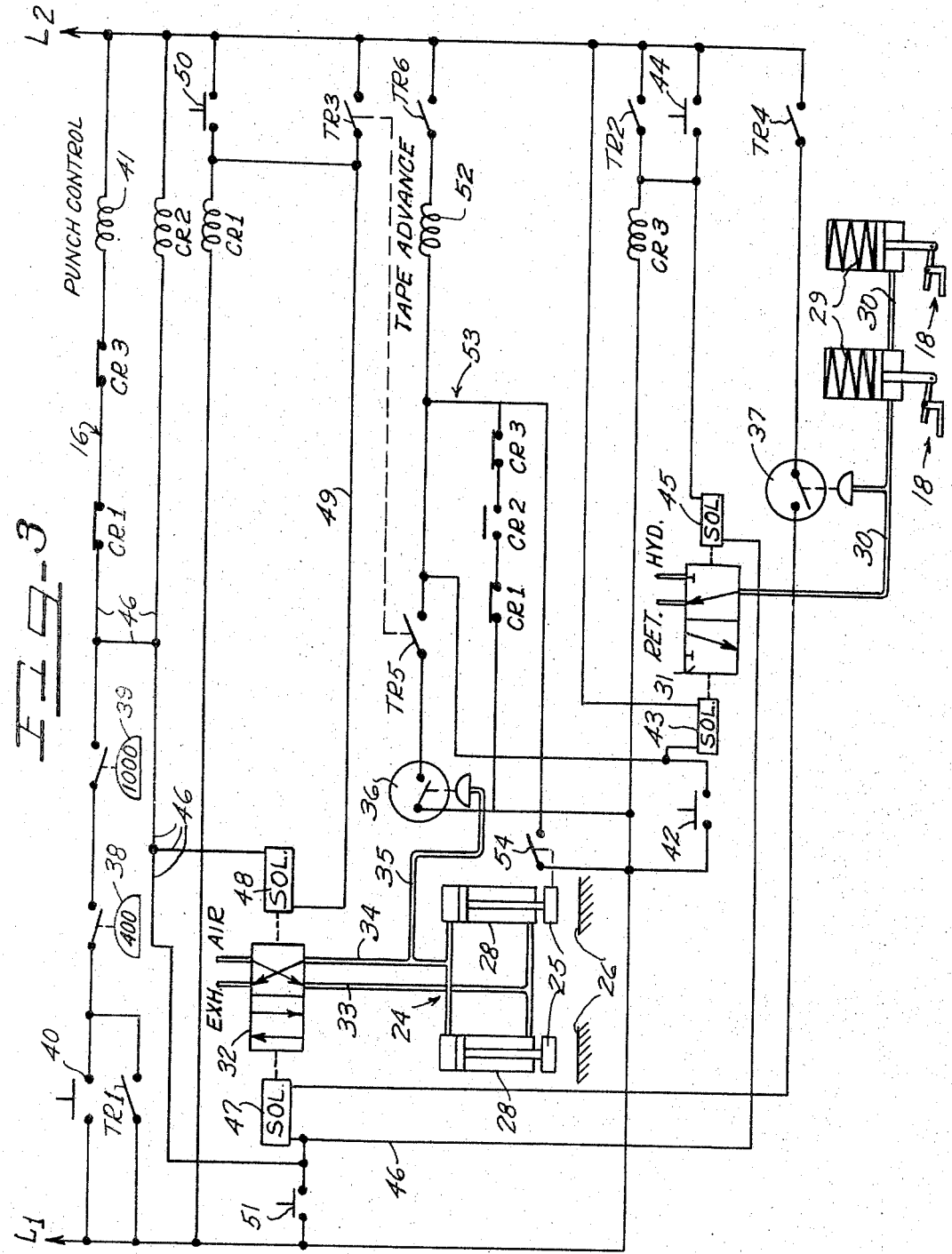

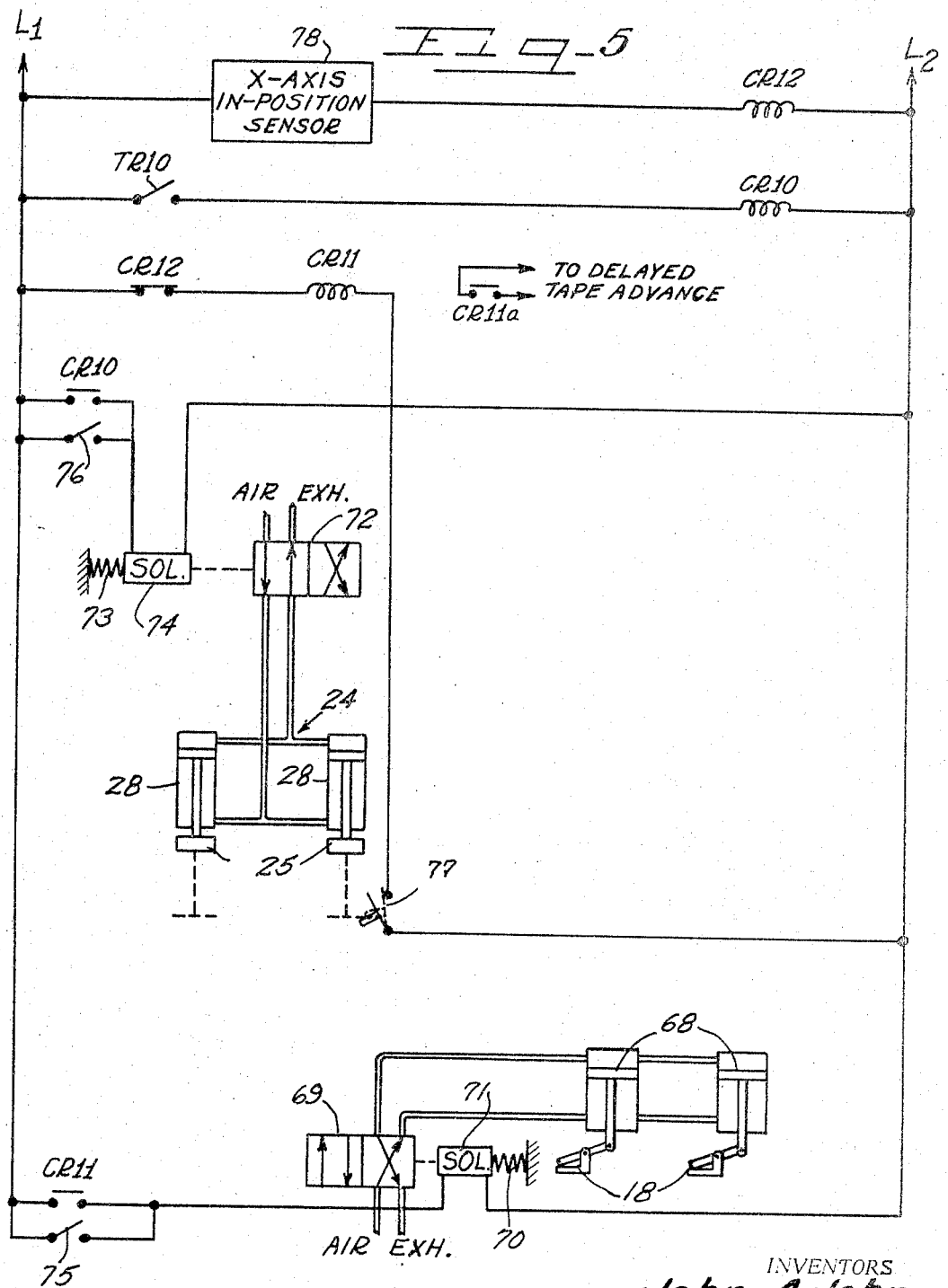

United States Patent Office 3,349,658
Patented Oct. 31, 1967

3,349,658
WORKPIECE POSITIONING SYSTEM
John A. Johns, Kenmore, and Arthur K. Schott, Clarence, N.Y., assignors to Houdaille Industries, Inc., Buffalo, N.Y., a corporation of Michigan
Filed Oct. 22, 1965, Ser. No. 502,143
14 Claims. (Cl. 83—71)

ABSTRACT OF THE DISCLOSURE

A punch press, having a 2-axis workpiece positioning system, is automatically controlled by a numerical tape control, and includes a fixedly lock mechanism for rigidly locking the workpiece in a fixed position while the workpiece positioning system releases its hold on the workpiece and moves alone for a programmed distance to regrasp the workpiece to enable punching thereof at previously inaccessible points, all without loss of dimensional references.

---

This invention relates generally to a machine tool, and more specifically to a workpiece positioning system, such as for shifting a workpiece about in two horizontal axes.

Although the principles of the present invention may be included in various machine tools, a particularly useful application is made in a punching machine, and more specifically in a punching machine of the type which is controlled by a numerical tape control.

When a punching machine is provided with a two-axis positioning system for moving a workpiece about horizontally, the workpiece can normally be moved no further in either axis than the inherent full travel or limits of the positioning system. Heretofore, when greater travel has been needed, the manufacturing has been accomplished by obtaining a still larger machine tool. Ultimately, such a remedy can become very expensive, particularly in view of the fact that a correspondingly larger amount of factory space is required for such a machine. Another practice has been to reposition a workpiece with it being held at a second location so that a different portion thereof is operated on by the machine. However for the perforations or other operations in the second portion to be dimensionally located accurately with respect to the operations on the first portion, a great deal of laborious labor is involved.

To this end, the present invention is directed to a system by which one portion of the workpiece may be machined, such portion corresponding to the limits of travel of the X-axis Y-axis positioning system. Then the system of the present invention temporarily holds the workpiece in a locked position while its normal grasp on the workpiece is released, and such clamps are moved a predetermined distance to grasp the workpiece at a new position, thereby enabling a portion of the workpiece to be machined which previously was beyond the range of the positioning system. Upon being regrasped by the clamps, the means which temporarily locked the workpiece in a stationary position is released.

Accordingly, it is an object of the present invention to provide a workpiece positioning system by which the workpiece may be progressively moved to enable access to a portion thereof which normally is beyond the range of the positioning system.

A further object of the present invention is to provide a system by which a workpiece may automatically be progressively moved with respect to the positioning system.

A still further object of the present invention is to provide a workpiece-positioning system which may be manually operated to obtain progressive move of the workpiece.

Yet another object of the present invention is to provide a workpiece positioning system which may be either automatically or manually operated to move the workpiece progressively with respect to such positioning system.

A still further object of the present invention is to provide a workpiece positioning system which is so constructed that the grasp by the system on the workpiece may be altered a precise amount so that dimensional relationships between operations performed on the workpiece before and after such altering will be accurately maintained.

Many other advantages, features and additional objects of the present invention will become manifest to those versed in the art upon making reference to the detailed description and the accompanying sheets of drawings in which preferred structural embodiments incorporating the principles of the present invention are shown by way of illustrative example.

In the drawings:

FIG. 1 is a front perspective view of a portion of a punching machine provided with a workpiece positioning system constructed in accordance with the principles of the present invention, and diagrammatically including certain portions of the control;

FIG. 2 shows the structure of FIG. 1, and illustrates one step in shifting the workpiece progressively with respect to the positioning system;

FIG. 3 is a diagram of the control system employed with the structure of FIG. 1;

FIG. 4 is a diagram of a modified workpiece positioning system provided in accordance with the principles of the present invention; and FIG. 5 is a still further modification thereof.

As shown in the drawings:

The principles of this invention are particularly useful when embodied in a machine tool 10 having a numerical tape control 11, the machine tool in this instance being a punching machine having a die 12, a reciprocable punch 13 driven by an eccentric 14 supported on a stationary portion 15 of the machine tool 10. The details thus far described are conventional and are somewhat diagrammatically illustrated, for example the punch 13 in practice typically is a punch and stripper assembly which is operatively coupled to the eccentric 14 by means of a punch control circuit partially illustrated at 16.

A workpiece may be received between the punch and stripper assembly 13 and the die 12, manually moved to dispose a desired point above the die 12, after which the punch control circuit 16 is manually actuated.

The punching machine 10 also includes a workpiece positioning system or device generally by the numeral 17 which includes a pair of clamps or clamp means 18, 18 which can grasp a workpiece 19 as shown in FIG. 2 at the rear edge thereof. The clamp means or work clamps 18 are adjustably secured to a support bar 20 at selected positions along its length, the support bar 20 being movable in the direction of its length as well as in a horizontal direction perpendicular to its length, as by conventional means. Such means typically include a first power driven moving means 21 which can shift the support bar in the direction of its length. The means 21 may comprise more than one actuator, here shown to be of the pressure-fluid operated type, and the positioning means typically includes similar actuators (not shown) but collectively schematically represented by the positioning means 21 so that the support bar 20 may be moved in the X-axis or in the Y-axis. As is explained below, movement in the X-axis is an essential in order to obtain the progressive move of this invention. In other embodiments described herein, the positioning means 21 may comprise an electric motor. The first power driven moving means 21 is under the control of the numerical tape control 11, and when such power driven moving means is a fluid actuator such as of the hydraulic type, such numerical tape control device serves to act through suitable solenoid valves to deliver pressurized fluid therethrough. In this example, it is preferred to employ solenoid valves collectively identified at 22 to deliver pressurized fluid at a typical pressure of 400 p.s.i. to one side of the piston in the actuators, and to deliver fluid pressure at 1000 p.s.i. to the opposite side of the piston of the various actuators 21. The operation of this invention and its construction can be fully understood without considering the corresponding system or channel for positioning the support bar in the Y-axis.

The numerical tape control 11 is conventional in principle and employs a reader head for reading the various combinations of commands that are set forth in the various blocks of signals. Although no reader head per se is shown herein, there are a number of switches illustrated herein which represent, when closed, a command signal which has been read by such tape control. In a conventional manner, the tape control thus includes switches which act through the solenoid valves 22, 23 or other power controlling devices to deliver an appropriate command to the first power driven means 21 to perform a predetermined specified precise move.

In normal operation, the numerical tape control 11 will thus deliver suitable commands to the positioning system 17 so that the workpiece 19 is successively disposed in line with the die 12 at the various positions where punching is to take place.

Any power driven moving means 21, such as the power driven moving means acting in the X-axis, has an inherent maximum extent of travel which limits the extent in the X-axis that the clamps, and hence the workpiece 19, can be moved. To extend this range without limit, the positioning system 17 is further provided with power driven lock means 24 which include a workpiece engaging end 25 which coacts with a fixed pad 26 carried on a fixed table 27. The lock means 24 are power driven, as by pneumatic actuators 28, the cylinders of which are carried by the fixed portion 15 of the machine tool. The lock means 24 serve as an index clamp by which the workpiece is temporarily held while the movable workpiece clamps 18 are being repositioned. To that end, the workpiece clamps 18 are under the control of a second power driven means 29 disposed within the clamps 18, and also shown diagrammatically in FIG. 3. The second power driven means 29 is thus in the nature of a fluid actuator in each of the clamps 18, the actuators being connected together by a fluid line 30.

When the workpiece 19 has been moved about by the numerical tape control 11 so that the entire portion of the workpiece which is within the range of the positioning device 17 has been punched, and when additional punching is needed beyond such range, the dimensional relationships between two portions of the workpiece are maintained as follows. Upon completion of punching of the portion of the workpiece above the die, the support bar 20 is indexed to the right, and the lock means 24 are extended as shown in FIG. 2 to clamp the workpiece 19 against the pads 26 shown in FIG. 1. While the workpiece is so held, the clamp means 18 are released by operation of the second power driven means 29, and then the support bar 20 is indexed to the left to grasp a further portion of the workpiece 19. Once the workpiece 19 has been so grasped, the lock means or index clamp 24 is released or opened, or moved upwardly, thereby freeing the workpiece 19 for movement through a further series of normal moves for punching. The progressive move of the workpiece with respect to the support bar 20 may be repeated as often as desired, and the progressive move can be programmed to take place in either direction.

The circuit by which these components are controlled is shown in FIG. 3. The second power driven means 29 in this embodiment is an actuator which is fluid pressure operated, and to that end, a 2-position 3-way hydraulic valve 31 is employed. The valve 31 is solenoid-actuated and is of the detent type so that the slide stays in either of the two positions after the corresponding solenoid has been momentarily actuated. The fluid pressure operated actuators 29 are of the spring-return type so that when the hydraulic valve 31 is disposed as illustrated, the springs in the actuators 29 force the fluid out to the return line to open the clamps 18. When the valve 31 is shifted to its opposite position, hydraulic fluid pressure is continually applied to the actuators 29 so that the clamp means 18 grasps the workpiece.

The actuators 28 of the power driven lock means 24 are of the double-acting type and are connected to a 2-position 4-way pneumatic valve 32 which is solenoid-operated and which is of the detent type wherein the slide remains in either of the two positions as a result of momentary actuation of the corresponding solenoid. In the open or retracted position, compressed air is directed to a line 33 which urges the lock means to the open position. When the pneumatic valve 32 is shifted to its other position, compressed air is directed to a line 34 which branches to the opposite side of both of the actuators 28 to urge the lower ends 25 against the workpiece. The pneumatic line 34 has a branch 35 leading to a tape-advance pressure switch 36. When the line 34 is first pressurized, pressure therein gradually builds up, particularly after the workpiece is engaged. Just before the maximum pressure is reached in the line 34, the pressure switch 36 closes. Thus the switch 36 is a control that is responsive to the extended position of the lock means, is a switch responsive to the locked position of the lock means 24, and is a fluid pressure responsive control means responsive to substantially the maximum normal fluid pressure which can build up in the lock means 24 in its locked position.

A further pressure switch 37 is fluidly connected to the line 30 and closes in response to substantially the maximum normal hydraulic pressure which can build up in the clamp actuators 29 in their closed-clamp position, and therefore the pressure switch 37 is a control means which is responsive to the clamped position of the clamp means 18. The pressure switch 37 is employed to open or unlock the lock means 24.

A still further pressure switch 38 and yet another pressure switch 39 are respectively fluidly connected to sense the fluid pressure being delivered by the solenoid valves 22 to the first power driven moving means 21, and being delivered by the solenoid valves 23 to the first power driven means 21. So long as the power driven means 21 is moving, maximum pressure will not build up on the last energized side thereof. However, as soon as movement of the support bar 20 terminates, the pressure switches 38, 39 will be closed when substantially the maximum normal fluid pressure which can build up in the power driven moving means 21 is reached. Thus the pressure switches 38, 39 are responsive to any stationary position of the support bar 20 for a use described below.

To operate the punch 13, the punch control circuit 16 includes a manual push button "go" switch 40 which brings power from a first line $L_1$, through the pressure switches 38, 39, and to a solenoid or relay coil 41, and thence to a second power line $L_2$. As the pressure switches 38, 39 are closed in response to the workpiece's being stationary, closing the switch 40 energizes the punch control circuit 16 to actuate or energize the punch control 41 which effects punching in a known manner. After such punching, the workpiece may be moved about through actuation of conventional manual controls (not shown) and additional punching accomplished. On completion of punching, a work clamp release switch 42 is momentarily manually energized. Doing so brings power from the line $L_1$ to a release solenoid 43 of the hydraulic valve 31 to position it in the position drawn, thereby effecting opening of the clamp means 18. To clamp the next workpiece there is provided a manual clamping switch 44 which completes a circuit to a solenoid 45 of the hydraulic valve 31 to shift it so that the line 30 is pressurized to close the clamp means 18. Closing the switch 44 also energizes the coil of a control relay CR3 which has two sets of normally closed contacts bearing the same designation, one located in the punch control circuit 16, and the other located in a tape advance circuit described below. Power to the hydraulic valve solenoid 45 which effects workpiece clamping is brought from the line $L_1$ through the "go" switch 40, through the pressure switches 38 and 39 which are closed when the workpiece is stationary and thence to a line or bus 46 to which the solenoid 45 is directly connected.

To obtain manually controlled progressive move, the pneumatic valve 32 is provided with a pair of solenoids 47, 48, each connected to the line or bus 46. The solenoid 48 is connected by a line 49 through a manual lock switch 50 to the line $L_2$. The solenoid 47 is connected by a bypassing manual unlocking switch 51 to the line $L_1$. The coil of a control relay CR1 is connected between the line $L_1$ and the line $L_2$ through the lock switch 50. The control relay CR1 has a pair of normally closed contacts in the punch control circuit 16, and a further set of normally closed contacts in the tape advance circuit described below. With the lock switch 50 closed, the punch control circuit is thereby disabled and when the workpiece is stationary, the "go" switch 40 on being closed energizes the solenoid 48 to lock the workpiece by means of the index clamp or lock means 24. Such locking firmly holds the workpiece so that the clamp means or work clamps 18 may now be released by actuating the release switch 42. Then the support bar 20 may be moved to the left or the right by means of the first power driven moving means 21 where the clamp means are at a new selected position. In this new position, the clamping switch 44 is actuated, thus effecting regrasping of the workpiece, and the release switch 51 for the index clamp or lock means 24 may be actuated to unlock or open the same.

The numerical tape control 11 is used not only to make normal moves of the workpiece, but is also employed to effect the foregoing progressive move automatically. The tape reader of such tape control 11 includes a number of switches for this purpose for controlling the valves 31, 32, the punch control 41, the solenoid valves 22 and 23 associated with the first power driven moving means 21, as well as a tape advance mechanism, here represented by a coil 52. A tape reader switch TR1 is connected across the "go" switch 40, a tape reader switch TR2 is connected across the workpiece clamp switch 44, a tape reader switch TR3 is connected across the lock switch 50, and a tape reader switch TR4 is connected in series with the hydraulic pressure switch 37 between the solenoid 47 of the pneumatic valve 32 and the line $L_2$ for performing the function of the unlocking switch 51 automatically.

The tape advance mechanism 52 is powered by the line $L_1$ through a tape advance circuit generally indicated at 53 which has three branches. The pneumatic pressure switch 36 is connected to the line $L_1$, and through a tape reader switch TR5 in series with the tape advance mechanism 52, which is connected through a further tape reader switch TR6 to the line $L_2$. The tape reader switch TR5 is programmed closed whenever the tape reader switch TR3 is programmed closed, and the tape reader switch TR6 is programmed closed whenever the machine tool is being operated by the numerical tape control 11. The coil of a relay CR2 also referred to herein as a first relay, is connected between the bus or line 46 and the line $L_2$, its contacts being normally open and being connected in series with normally closed contacts of the relays CR1 and CR3 from the line $L_1$ to the tape advance mechanism 52, and thus forming a second branch of the tape advance circuit 53. Thus each time that the bus 46 is energized while the machine is under tape control, the tape advance mechanism 52 is also energized. The third branch of the tape advance circuit 53 includes a momentary switch 54 which is actuated by the power driven lock means 24. The switch 54 is of the one-way momentary type so arranged that downward movement of the lock means or index clamp 24 does not actuate the switch 54, but upward movement thereof does momentarily actuate such switch 54. Thus the switch 54 is a control which is responsive to the position of the lock means 24 to actuate the tape advance mechanism, and more specifically is a switch responsive to an unlocked position thereof during only unlocking movement. Switches of this type are commercially available.

Whenever there is a taped command to operate the punch control circuit 16, the tape reader switch TR1 is closed, and with the workpiece stationary, both the punch control circuit and the coil of the first relay means CR2 are energized, thus also closing the relay contacts CR2 in the tape advance circuit 53 to advance the tape. When it is desired to go through the progressive move sequence, not only is a punching command programmed, but there is a command to close the tape reader switch TR3 which energizes the coil of the relay means CR1, thereby disabling the punch control circuit 16 and the ability of control relay CR2 to advance the tape advance mechanism 52.

A taped command sensed by tape reader switch TR2 to close the clamp means 18 also energizes the coil of the relay means CR3, and thus with one set of its contacts disables only the punch control circuit and with its other set of contacts disables the tape advance mechanism 52.

The pressure switches 38, 39 serves to energize the bus 46 and thus tentatively and jointly initiates punching by the punch control circuit 16, clamping by the power driven means 29, and both locking and unlocking by the power-driven lock means 28. However, under this circumstance, the tape is so programmed that any predetermined three of said locking, said unlocking, said clamping, and said punching functions are disabled.

In tape-controlled operation, the operational sequence is as follows: The workpiece is manually placed in the work clamps 18 and is clamped by momentarily closing the manual clamping switch 44. As the workpiece is not disposed over the die 12 during loading, manual operation of the punch or "go" switch 40 test tool alignment and energizes the tape advance mechanism 52 through the control relay CR2. Thereafter, each block of tape normally contains a position command and always a punch command so that the tape reader normally reads the tape, causes the workpiece to be moved to a commanded position, and to be punched when the pressure switches 38, 39 are closed to signal the end of such move. Thus a further tape advance is also commanded.

When it is desired to index the workpiece by moving it progressively, the first block of tape in the progressive move sequence contains a position command which shifts the workpiece to the desired location, and a command which closes the tape reader switch TR3 to effect temporary locking of the workpiece. The control relay CR1 is immediately energized inhibiting both punching and tape advancing. At the end of the move of the workpiece, the pressure switches 38, 39 reclose and the solenoid 48 of the pneumatic valve 32 is energized by the tape reader switch TR3. When the index clamps 24 are fully closed, the pressure switch 36 closes energizing the solenoid 43 of the hydraulic valve 31, thereby opening the work clamps 18. At the same time, the tape advance mechanism 52 is energized to present the next block of tape. The next block of tape contains the command for the actual index move of the support bar 20, and a command to close the tape reader switch TR2. The control relay CR3 is immediately energized to again inhibit the normal punching and tape advancing actions. At the end of the indexing move of the workpiece, the pressure switches 38, 39 again close, allowing the solenoid 45 of the hydraulic valve 31 to be energized, thereby reclosing the work clamps 18. As these clamps 18 close, pressure builds up and closes the pressure switch 37 which energizes the solenoid 47 of the pneumatic valve 32 through the closed contacts of the tape reader switch TR4, thereby opening the index clamps or lock means 24 to release the workpiece. Such release completes the progressive move and normal operation is thereafter resumed.

FIG. 4 illustrates a modified form of the invention. The work clamps or clamp means 18 are driven by a fluid pressure actuated actuator or second power driven means 55 which corresponds to the means 29 of FIG. 3 except that the actuators 55 are pneumatically operated. These are connected by a line 56, corresponding to the line 30, to a pneumatic valve 57 having a pair of solenoids 58, 59, corresponding to the hydraulic valve 31 of FIG. 3.

A modified form of index clamps or lock means 59 is employed which is disposed beneath the workpiece and mounted to the underside of the table 27 with the upper end of the piston rods terminating in a pair of hook-like formations 60. The hooks 60 face toward an edge of the workpiece, but are here illustrated as being rotated for convenience of illustration. As illustrated, the hooks 60 are disposed below the level of the table 27. When the actuators of the index clamps 59 are extended, the hooks extend upwardly through the table 27 and above the workpiece 19 as shown in dashed lines. In a clamping position, the workpiece 19 extends beneath the hooks 60, preventing the hooks 60 from returning to the closed position or retracted position. The workpiece therefore is thereby locked to the table.

Whenever a move command is present in the tape logic, a commanded movement control relay 61 is energized, such relay having a set of normally closed contacts 61c which bring power from the line $L_1$ to an auxiliary bus 62. To operate the punch manually, a normally open momentary push button switch 63 is closed. To advance the tape manually, the tape advance mechanism 52 is connected to the auxiliary bus 62 by a tape advance switch 64 of the normally open maintained type, which remains closed when actuated. To operate the index clamp or lock means 59, there is provided a selector switch 65 which brings power from the auxiliary bus 62 to either of the solenoids 47 or 48 of the pneumatic valve 32. To operate the work clamps or clamp means 18, there is provided a further selector switch 66 which brings power from the auxiliary bus to either of the solenoids 58 or 59 of pneumatic valve 57.

To operate the system under the control of the numerical tape control 11, there is provided a tape reader switch TR7, a tape reader switch TR8, and a tape reader switch TR9. The tape reader switch TR7 connects the coil of a punch control relay CR7 to the line $L_1$. The tape reader switch TR8 and the tape reader switch TR9 similarly respectively connect an index clamp control relay or lock means control relay CR8 to the line $L_1$, and a work clamp control relay or clamp means control relay CR9 to the line $L_1$ respectively. The punch control relay CR7 has a first set of normally open contacts CR7a which is connected in shunt relation to the manual punching switch 63, a second set of normally open contacts CR7b connected in shunt relation to the tape reader switch TR7, and a third set of normally closed contacts CR7c connected in immediate series with the tape advance switch 64. The control relay CR8 for the index clamps 59 has a first set of normally open contacts CR8a which is connected in series between the auxiliary bus 62 and the selector switch 65, and a second set of normally open contacts CR8b which connect the line $L_1$ to the solenoid 48 of the pneumatic valve 32. Similarly, the control relay CR9 for the work clamps 18 has a set of normally closed contacts CR9a connecting the auxiliary bus 62 to the selector switch 66, and a set of normally open contacts CR9b connecting the line $L_1$ to the solenoid 59 of the pneumatic valve 57.

A 2-section limit switch 67 includes one set of normally closed contacts 67a which is connected in series with the punch control relay contacts CR7b to form a holding circuit that shunts the tape reader switch TR7. The switch 67 includes a set of normally open contacts 67b which is connected between the auxiliary bus 62 and the control relay 52 for the tape advance mechanism and which thus and therewith forms a tape advance circuit. The switch 67 is actuated by movement of the punch 13.

To operate this system automatically, the workpiece 19 is clamped in the work clamps 18. With the system components arranged as drawn, when power is applied to the lines $L_1$, $L_2$, the solenoid 58 would be energized, thus shifting the valve 57 to the position which closes the work clamps 18. Thus to open the clamps, the selector switch 66 is positioned to deliver power to the solenoid 59, the workpiece then being inserted, and then the selector switch 66 is returned to the illustrated position.

With the workpiece 19 thus loaded, the tape advance switch 64 is closed and left in a closed position. In normal operation, each block of tape contains a move command which actuates the relay 61 to open its contacts 61c during such move, and each block also contains a punch command which is sensed by the tape reader switch TR7 for the punch, thereby energizing the punch control relay CR7. Operation of the punch control relay CR7 closes its normally open contacts CR7b to establish a holding circuit through the ram switch contacts 67a. Also, operation of the punch control relay CR7 opens the normally closed contacts CR7c so that the tape advance mechanism 52 cannot be reenergized until the punch ram action actuates the switch 67 to close momentarily the contacts 67b. Therefore the block is read, the move of the workpiece is made, and at the completion of such move, the relay contacts 61c reclose and energize the punch solenoid through the relay contacts CR7a. Operation of the punch control 41 effects ram movement which trips the switch 67 which therefore triggers tape advance to the next block.

When progressive move is desired under the control of the numerical tape control 11, the first block of tape in the sequence contains a move command which positions the rear edge of the workpiece two inches in front of the index clamps 59. No punching signal is included in that block so that the punch control relay CR7 does not operate, and therefore as soon as the move has been completed, the contacts 61c energize the auxiliary bus 62 to bring power through the tape advance switch 64 and the normally closed contacts CR7c to energize the tape advance mechanism 52.

The next block of tape contains a command to open the index clamps or lock means 59, which command is instantly sensed by the tape reader contacts TR8 connected to the index clamp control relay CR8, thereby effecting closing of the contacts CR8b to energize the solenoid 48, thereby bringing air into the line 34 to extend the hooks 60 to the uppermost position. As this block also contains a command for the workpiece to move two inches to the rear, the workpiece is moved into a position beneath the hooks 60. Just before the hooks 60 were raised, the solenoid 47 was in an energized state, and actuation of the control relay CR8 for the index clamps shifted the power from the solenoid 47 to the solenoid 48. The tape reader switches TR7, TR8, and TR9 are of the momentary type, and no holding circuit is used for the tape reader switches TR8 and TR9. Therefore, the tape reader switch TR8 opens of itself to deenergize the coil of the control relay CR8, thereby restoring the position of the contacts thereof CR8 and CR8b to the position illustrated to effect a retraction of the hooks 60. However, such retraction is arrested by engagement of the hooks 60 with the upper side of the workpiece 19, whereby the workpiece is clamped or locked in a position for indexing. Note that the retraction of the hooks 60 into a position against the workpiece 19 is, however, delayed until the two-inch move is completed since the relay contacts CR8a are powered from the auxiliary bus 62. Since no punch command is in such block of tape, closing of the contacts 61c also again initiates tape advance as described.

The next block of tape contains a command to open the work clamps 18, and a command to move the clamps laterally by means of the support bar 20. The command to open the work clamps is read by the tape reader contacts TR9 which closes the circuit to the coil of the work clamp control relay CR9, thereby causing the contacts CR9a and CR9b to flip so that the former contacts are deenergized and the latter ones are closed and energized. Energizing of the relay contacts CR9b directs power to the solenoid 59 of the pneumatic valve 57 which vents the pneumatic actuators 55, thereby opening the work clamps 18. This cycle is the same as that for the index clamps or lock means 59 so that because of the lateral move then taking place, the contacts 61c are open to render the auxiliary bus 62 deenergized. During such lateral move, the momentary nature of the tape reader contacts TR9 causes such contacts or switch to open, thereby deenergizing the coil of the work clamp relay CR9, and restoring its contacts CR9a and CR9b to the position illustrated. This tends to energize the solenoid 58, tending to reclose the work clamps, an action which takes place as soon as the auxiliary bus 62 is reenergized in response to completion of the movement of the workpiece. As there is no punch command, such reenergizing of the auxiliary bus 62 also reenergizes the tape advance mechanism 52.

The next block of tape contains a command to open the index clamps or lock means 59, and a move which is at least two inches forward instead of backward. Note that this block is otherwise the same as the next to the last block described above. Therefore, in exactly the same manner, the hooks 60 move to the open or uppermost position, the part moves forward, and the index clamps or lock means 59 closes at the end of the move as before. In this instance however, as the workpiece is clear of the hooks 60, the hooks 60 are retracted through the table 27 leaving the area clear for normal programming.

FIG. 5 illustrates a further simplified schematic diagram of structure employed to obtain progressive move or indexing of the workpiece as previously described. In this embodiment, the work clamps 18 or clamp means are actuated by second power-driven means in the form of fluid pressure operated actuators 68, 68 which are of the double-acting pneumatic type. These are connected in parallel to each other and to a pneumatic four-way valve 69 wherein a compression spring 70 restores the slide to the position indicated whenever a solenoid 71 thereof is deenergized. Similarly, a pneumatic valve 72 of the four-way type employs a slide which is in either of two positions respectively determined by a compression spring 73 or a solenoid 74.

A manual selector switch 75 connects the solenoid 71 to the line L₁ to effect opening of the clamp means 18, and release of the switch 75 automatically effects closing of the clamp means 18 as drawn.

A manual selector switch 76 connects the solenoid 74 to the line L₁ to cause the index clamps or lock means 24 to move to a workpiece-locking position. Release of the manual selector switch 76 enables the compression spring 73 to restore the pneumatic valve 72 to the position illustrated, thereby effecting unlocking or raising of the clamps.

A set of relay contacts CR10 is connected in shunt relation to the switch 76, while a further set of relay contacts CR11 is connected in shunt relation to the switch 75. There is also provided a limit switch 77 which is actuated by the lock means or index clamps 24 near their locked position. The illustration is somewhat schematic as this actuation is operative to effect tape advance as a result of both locking and as a result of unlocking.

In this circuit, manual advance of the tape and manual punch commands are made a part of the numerical tape control 11 and are not interconnected in the circuitry of FIG. 5 which illustrates the progressive move circuitry. The work clamps or clamp means are normally closed and can be opened or reclosed by use of the manual switch 75. Similarly, the index clamp or lock means 24 is normally open, and can be closed or locked by actuation of the manual switch 76.

For automatic operation of this system, the first block of tape includes a command to position the workpiece in the proper position in the Y-axis to dispose it properly beneath the lower ends 25 of the index clamps or lock means 24. Further, there is an X-axis command which disposes the work clamps or clamp means 18 in a suitable position for indexing. The first block of tape also turns off the punch signal. As the tape advance is controlled within the numerical tape control 11, when the move signal has been completed, the tape advances.

The second block of tape in the progressive move sequence includes a command which turns off the automatic advance of the tape reader until an external signal is given. This block includes a further command which, in simplified form, includes a tape reader switch TR10 for sensing such command, and which switch TR10 is operative to close a relay CR10 having the contacts CR10 which actuate the index clamps or lock means 24 which remain closed or locked so long as the control relay contacts CR10 remain closed. When the index clamps or lock means 24 close, they actuate the limit switch 77 substantially at the moment that the workpiece is locked to the table. The closing of the limit switch 77 energizes the coil of a control relay CR11 having the contacts CR11 which on being closed effect operation of the work clamps or clamp means 18. These remain open so long as the solenoid 71 is energized. The control relay CR11 closed by the limit switch 77 contains a further set of contacts CR11a which act through a delay circuit to restore tape advance control to the numerical tape control 11. This delay assures completion of all functions before the tape advances.

At the end of this delay, the third block of tape is read which includes only the command for the support bar 20 to move the clamp means 18 laterally in an indexing move. At the end of this move, a means schematically indicated at 78 senses that the move has been completed and emits a signal which unlatches the control relay CR11 for the work clamps 18 such function being here illustrated as being provided by a control relay CR12 whose coil is thus energized, and which includes normally open contacts CR12 in series with the coil of the work clamp relay CR11. Such opening of the contacts CR12 causes the relay contacts CR11 to open, thereby permitting the work clamps 18 to reclose.

The fourth block of tape contains a signal by which the relay contacts CR10 are opened. By way of example, opening of the tape reader contacts TR10 are illustrative of this type of operation in simplified form. Opening of the index clamps 24 again actuates the limit switch 77 so as to initiate a delayed tape advance, thereby allowing time for the index clamps or lock means 24 to clear before the next block of tape is read.

Such next block of tape turns the punch signal back on if desired, and normal programming continues.

Although various minor modifications might be suggested by those versed in the art, it should be understood that we wish to embody within the scope of the patent warranted hereon, all such embodiments as reasonably and properly come within the scope of our contribution to the art.

We claim as our invention:

1. A device for positioning a workpiece in a machine tool, comprising:
   (a) a support bar adapted to be moved with respect to the machine tool;
   (b) first power-driven means connected to said support bar for moving it in at least one axis;
   (c) clamp means carried by said support bar for grasping the workpiece to effect movement thereof with said support bar;
(d) second power-driven means connected to said clamp means for opening and closing it;
(e) power-driven lock means adapted to be carried by a fixed portion of the machine tool for temporarily locking the workpiece in whatever position it may be disposed;
(f) a tape control having a tape advance mechanism, and including a number of switches responsive to successive blocks of numerical control data on said tape and connected to control said first and second power-driven means and said power-driven lock means; and
(g) control means responsive to a predetermined position of said lock means, and connected to actuate said tape advance mechanism.

2. A positioning device as claimed in claim 1 in which said control means is a further switch responsive to the locked position of said lock means.

3. A positioning device as claimed in claim 1 in which said control means is a further switch responsive to an unlocked position of said lock means during only unlocking thereof.

4. A device for positioning a workpiece in a machine tool, comprising:
(a) a support bar adapted to be moved with respect to the machine tool;
(b) first power-driven means connected to said support bar for moving it in at least one axis;
(c) clamp means carried by said support bar for grasping the workpiece to effect movement thereof with said support bar;
(d) second power-driven means connected to said clamp means for opening and closing it;
(e) power-driven lock means adapted to be carried by a fixed portion of the machine tool for temporarily locking the workpiece in whatever position it may be disposed;
(f) a tape control having a number of switches responsive to successive blocks of numerical control data on said tape and connected to control said first and second power-driven means and said power driven lock means; and
(g) control means responsive to the clamped position of said clamp means, and operative, under the control of at least one of said tape-controlled switches, on said power-driven lock means to effect opening of said lock means.

5. A device for positioning a workpiece in a machine tool, comprising:
(a) a support bar adapted to be moved with respect to the machine tool;
(b) first power-driven means connected to said support bar for moving it in at least one axis;
(c) clamp means carried by said support bar for grasping the workpiece to effect movement thereof with said support bar;
(d) second power-driven means connected to said clamp means for opening and closing it;
(e) power-driven lock means adapted to be carried by a fixed portion of the machine tool for temporarily locking the workpiece in whatever position it may be disposed;
(f) a tape control having a tape advance mechanism, and including a number of switches responsive to successive blocks of numerical control data on said tape and connected to control said first and second power-driven means and said power driven lock means;
(g) a further switch responsive to the locked position of said lock means, and connected to actuate said tape advance mechanism,
(h) a still further switch responsive to an unlocked position of said lock means during only unlocking thereof, and also connected to actuate said tape mechanism; and
(i) control means responsive to the clamped position of said clamp means, and operative, under the control of at least one of said tape-controlled switches, on said power-driven lock means to effect opening of said lock means.

6. A device for positioning a workpiece in a machine tool, comprising:
(a) a support bar adapted to be moved with respect to the machine tool;
(b) power-driven moving means connected to said support bar for moving it in at least one axis;
(c) clamp means carried by said support bar for grasping the workpiece to effect movement thereof with said support bar;
(d) power-driven actuator means connected to said clamp means for opening and closing it;
(e) fluid-pressure operated lock means adapted to be carried by a fixed portion of the machine tool for temporarily locking the workpiece in whatever position it may be disposed;
(f) a tape control having a tape advance mechanism, and including a number of switches responsive to successive blocks of numerical control data on said tape and connected to control said power-driven moving means, said power-driven actuator means, and said fluid-pressure operated lock means; and
(g) fluid-pressure responsive control means responsive to substantially the maximum normal fluid pressure which can build up in said lock means in its locked position, and operative to actuate said tape advance mechanism.

7. A device for positioning a workpiece in a machine tool, comprising:
(a) a support bar adapted to be moved with respect to the machine tool;
(b) power-driven moving means connected to said support bar for moving it in at least one axis;
(c) clamp means carried by said support bar for grasping the workpiece to effect movement thereof with said support bar;
(d) fluid-pressure-operated actuator means connected to said clamp means for opening and closing it;
(e) power-driven lock means adapted to be carried by a fixed portion of the machine tool for temporarily locking the workpiece in whatever position it may be disposed;
(f) a tape control having a number of switches responsive to successive blocks of numerical control data on said tape and connected to control said power-driven moving means, said fluid-pressure-operated actuator means, and said power-driven lock means; and
(g) fluid-pressure responsive control means responsive to substantially the maximum normal fluid pressure which can build up in said actuator means in its closed-clamp position, and operative, under the control of at least one of said tape-controlled switches, on said power driven lock means to effect opening of said lock means.

8. A device for positioning a workpiece in a machine tool, comprising:
(a) a support bar adapted to be moved with respect to the machine tool;
(b) power-driven moving means connected to said support bar for moving it in at least one axis;
(c) clamp means carried by said support bar for grasping the workpiece to effect movement thereof with said support bar;
(d) fluid-pressure-operated actuator means connected to said clamp means for opening and closing it;
(e) fluid-pressure-operated lock means adapted to be carried by a fixed portion of the machine tool for temporarily locking the workpiece in whatever position it may be disposed;
(f) a tape control having a tape advance mechanism and including a number of switches responsive to successive blocks of numerical control data on said tape and connected to control said power-driven moving means, said fluid-pressure-operated actuator means, and said fluid-pressure-operated lock means; and
(g) first fluid-pressure responsive control means responsive to substantially the maximum normal fluid pressure which can build up in said actuator means in its closed-clamp position, and operative, under the control of at least one of said tape-controlled switches, on said fluid-pressure-operated lock means to effect opening of said lock means; and
(h) second fluid-pressure responsive control means responsive to substantially the maximum normal fluid-pressure which can build up in said lock means in its locked position, and operative to actuate said tape advance mechanism.

9. A device for automatically positioning a workpiece in a punching machine having a punch control circuit, comprising:
(a) a support bar adapted to be moved with respect to the machine tool;
(b) first power-driven means connected to said support bar for moving it in at least one axis;
(c) clamp means carried by said support bar for grasping the workpiece to effect movement thereof with said support bar;
(d) second power-driven means connected to said clamp means for opening and closing it;
(e) power-driven lock means adapted to be carried by a fixed portion of the machine tool for temporarily locking the workpiece in whatever position it may be disposed;
(f) a tape control responsive to successive blocks of numerical control data on the tape and connected to control said first and second power-driven means, said power-driven lock means, and the punch control circuit, said tape control including a tape advance mechanism;
(g) first relay means having contacts connected to effect operation of said tape advance mechanism, and having a coil connected to be operated by any taped command to operate the punch control circuit; and
(h) second relay means having contacts connected to disable only the punch control circuit, and other contacts connected to disable said tape advance mechanism, and including a first coil responsive to any taped command to said second power-driven means to close said clamp means, and a second coil responsive to any taped locking command to said power-driven lock means to effect such disabling.

10. A device for positioning a workpiece in, and controlling operation of, a punching machine, comprising in combination:
(a) a support bar adapted to be moved with respect to the machine tool;
(b) pressurized-fluid actuator means connected to said support bar for moving it in at least one axis;
(c) clamp means carried by said support bar for grasping the workpiece to effect movement thereof with said support bar;
(d) power-driven means connected to said clamp means for opening and closing it;
(e) power-driven lock means adapted to be carried by a fixed portion of the machine tool for temporarily locking the workpiece in whatever position it may be disposed;
(f) a punch control circuit;
(g) fluid-pressure responsive control means responsive to substantially the maximum normal fluid pressure which can build up in said pressurized-fluid actuator means in any stationary position, and operative to tentatively and jointly control locking by said power-driven lock means, unlocking by said power-driven lock means, clamping by said power-driven means, and punching by said punch control circuit; and
(h) control means for disabling any predetermined three of said locking, said unlocking, said clamping, and said punching when tentatively operated by said fluid-pressure responsive control means.

11. A device for positioning a workpiece in a machine tool, comprising:
(a) a support bar adapted to be moved with respect to the machine tool;
(b) first power-driven means connected to said support bar for moving it in at least one axis;
(c) clamp means carried by said support bar for grasping the workpiece to effect movement thereof with said support bar;
(d) second power-driven means connected to said clamp means for opening and closing it;
(e) power-driven lock means adapted to be carried by a fixed portion of the machine tool for temporarily locking the workpiece in whatever position it may be disposed;
(f) a tape control having a tape advance mechanism, and including a number of switches responsive to successive blocks of numerical control data on said tape and connected to control said first and second power-driven means and said power-driven lock means; and
(g) control means responsive to the position of said lock means, and connected to said second power-driven means to effect opening of said clamp means, said control means being arranged to effect said opening whenever said lock means is in its locked position.

12. A positioning device as claimed in claim 11 in which said control means is a further switch responsive to the locked position of said lock means.

13. A device for positioning a workpiece in a machine tool, comprising:
(a) a support bar adapted to be moved with respect to the machine tool;
(b) first power-driven means connected to said support bar for moving it in at least one axis;
(c) clamp means carried by said support bar for grasping the workpiece to effect movement thereof with said support bar;
(d) second power-driven means connected to said clamp means for opening and closing it;
(e) power-driven lock means adapted to be carried by a fixed portion of the machine tool for temporarily locking the workpiece in whatever position it may be disposed; and
(f) means responsive to completion of a move by said first power-driven means, and operative to control reclamping by said second power-driven means.

14. A device for positioning a workpiece in a machine tool, comprising:
(a) a support bar adapted to be moved with respect to the machine tool;
(b) first power-driven means connected to said support bar for moving it in at least one axis;
(c) clamp means carried by said support bar for grasping the workpiece to effect movement thereof with said support bar;
(d) second power-driven means connected to said clamp means for opening and closing it;
(e) power-driven lock means adapted to be carried by a fixed portion of the machine tool for temporarily locking the workpiece in whatever position it may be disposed;
(f) a punch control circuit;
(g) a tape control having a tape advance circuit, and including a number of switches responsive to successive blocks of numerical control data on said tape for controlling said first and second power-driven means, said power-driven lock means, and said punch control circuit; and (h) means responsive to completion of a move by said first power-driven means, and operative to supply power to said tape advance circuit and to one of
(1) said punch control circuit,
(2) said power-driven lock means for locking the position of the workpiece, and
(3) said second power-driven means for closing the clamp means onto the workpiece.

References Cited

UNITED STATES PATENTS

| | | | |
|---|---|---|---|
| 1,560,918 | 11/1925 | Stubgen | 83—414 |
| 2,397,974 | 4/1946 | Morrow et al. | 83—277 X |
| 3,184,947 | 5/1965 | Erskine et al. | 83—277 X |
| 3,212,380 | 10/1965 | Gobel et al. | 83—277 X |
| 3,231,099 | 1/1966 | Kidd | 83—277 X |
| 3,233,485 | 2/1966 | Creamer | 83—71 |

ANDREW R. JUHASZ, *Primary Examiner.*